(12) United States Patent
Shovlin et al.

(10) Patent No.: US 7,259,703 B2
(45) Date of Patent: Aug. 21, 2007

(54) DEVICE FOR RECORDING LASER TRIM PROGRESS AND FOR DETECTING LASER BEAM MISALIGNMENT

(75) Inventors: Guy J. Shovlin, Allen, TX (US); Melese Teklu, Dallas, TX (US); Pramodchandran N. Variyam, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 523 days.

(21) Appl. No.: 10/811,357

(22) Filed: Mar. 25, 2004

(65) Prior Publication Data

US 2005/0212650 A1    Sep. 29, 2005

(51) Int. Cl.
*H03M 1/00* (2006.01)
*H01C 10/00* (2006.01)
(52) U.S. Cl. .................... 341/121; 338/92; 327/354
(58) Field of Classification Search .............. 323/297, 323/298; 327/525; 338/92, 185, 196, 198, 338/288, 289; 341/121, 154
See application file for complete search history.

(56) References Cited

U.S. PATENT DOCUMENTS 4,016,483 A * 4/1977 Rudin ..................... 323/354
4,673,866 A * 6/1987 Masuda .................... 323/313
6,144,248 A * 11/2000 Oosugi et al. ............. 327/525

FOREIGN PATENT DOCUMENTS

JP      05289758 A  * 11/1993
JP      10335594 A  * 12/1998

OTHER PUBLICATIONS

Abstract and figure of Korean application KR 2001018087 A by Kim et al., Mar. 5, 2001.*

* cited by examiner

*Primary Examiner*—Howard L. Williams
(74) *Attorney, Agent, or Firm*—Allan K. Stewart; W. James Brady; Frederick J. Telecky, Jr.

(57) ABSTRACT

The device for detecting and tracking a status of a device under laser trim includes: a series connected string of trim tracking links; and a plurality of detecting devices wherein each detecting device is coupled in parallel with a corresponding trim tracking link. This device allows detection of laser beam to work surface misalignment and the termination of lasing before critical active circuit components can be damaged.

7 Claims, 3 Drawing Sheets

DEVICE FOR RECORDING LASER TRIM PROGRESS AND FOR DETECTING LASER BEAM MISALIGNMENT

FIELD OF THE INVENTION

The present invention relates to electronic circuitry and, in particular, to laser trimming of electrical circuits, and more particularly, to a circuit with minimum area for detecting laser beam to device misalignment and for recording the incremental progress of trimming events on an electrical circuit.

BACKGROUND OF THE INVENTION

Laser trimming is a commonly used technique for improving the performance of linear and mixed signal devices. This may be accomplished by measuring a device parameter, deciding what component value is required to favorably modify that parameter and then cutting electrically conductive metal links to insert the prescribed value into the active circuit. Laser trimming is often performed during the electrical probing of fabricated wafers. Laser trimming can compensate for much of the fabrication process variation and enhance the product yield.

During laser trim, damage to the circuit under trim can occur (1) when the laser beam is not accurately aligned to the target links or (2) when a circuit is re-trimmed after a prior laser trim attempt. These undesired trim incidences can result in component or substrate damage. This is caused by the laser striking an unintended circuit component, in the case of laser misalignment, or the laser repeatedly striking the same target link in the case of re-trim. These inappropriate laser blasts may cause the circuit under trim to fail during post trim testing or, far worse, cause the trimmed circuit to fail prematurely in its final operating environment.

Thus it is important to have trim methods and supporting circuit structures that can detect and track the status of the device under trim. Such a feature should be able to (1) identify trim structures or groups of structures that have been trimmed during a prior laser trim session and (2) provide a means of assuring laser beam alignment to critical trim features before applying a laser pulse or series of pulses to these features. Such circuit structures do not directly enhance the functionality of the device. Hence it is very important that the area overhead of these structures is very small.

A straight forward method of tracking trim progress is by using trim tracking laser links to program the state of a memory cell to logic "1" or "0". One can decode the trim status by looking at the content of the memory cells dedicated for this purpose. However, many devices that use laser trim may not have digital circuitry in them and memory cell approach cannot be used in such devices.

Another approach involves the use of a set of fuse links to record the progress of trim. Each link in this approach is as shown in FIG. 1. In this approach, whenever it is necessary to record the progress of trim, one trim tracking link is cut using a laser. This will sever the electrical continuity between the two pads at each end of the link. Presence or absence of a link can be detected by forcing a current through the link and measuring the voltage across it. Thus progression of the trim can be tracked by checking the continuity across all the trim tracking links. This structure requires one probe pad per added fuse link. Thus if there are n trim steps that are to be tracked, n extra bond pads are required. These additional probe pads consume thousands of square microns of valuable device area in most circuit fabrication processes.

SUMMARY OF THE INVENTION

A device for detecting and tracking a status of a device under laser trim includes: a series connected string of trim tracking links; and a plurality of detecting devices wherein each detecting device is coupled in parallel with a corresponding trim tracking link. This device allows detection of laser beam to work surface misalignment and the termination of lasing before critical active circuit components can be damaged.

DETAILED DESCRIPTION OF PREFERRED EMBODIMENTS

The present invention is described by presenting some different simple cases first and then the final preferred embodiment solution.

Figure 2:
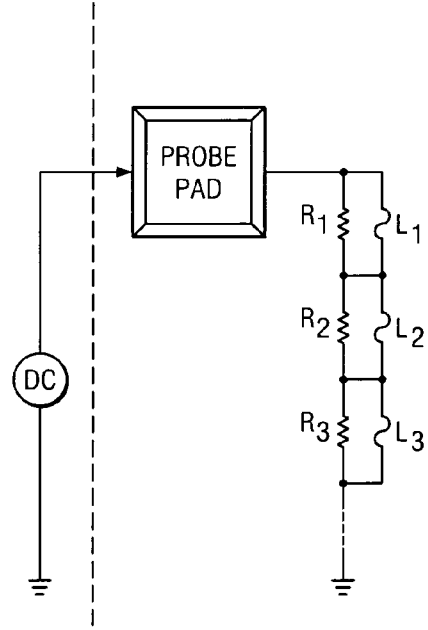
FIG. 2 is a diagram of a laser trim tracking circuit using resistors as the detection devices.

A first circuit structure, that reduces the required number of probe pads and silicon area, consists of a set of parallel combination of resistors R1, R2, and R3, and trim tracking links L1, L2, and L3 connected serially as shown in FIG. 2. As each link is cut using the laser, this network will change its load characteristic. Presence and absence of a link can be detected by measuring the total impedance seen between the probe pad and ground. For the specific example shown in the FIG. 2, measured resistance of zero ohms means no links have been cut, and the laser trimming process is yet to start. A resistance of R1 means that one step in the laser trim is complete and laser energy should be turned on only during the second trim step. Thus each trim log point can be recorded by blasting a link and increasing the total series resistance by one resisistor value. As can be seen from FIG. 2, this circuit structure requires only one bond pad for several trim tracking links.

Figure 3:
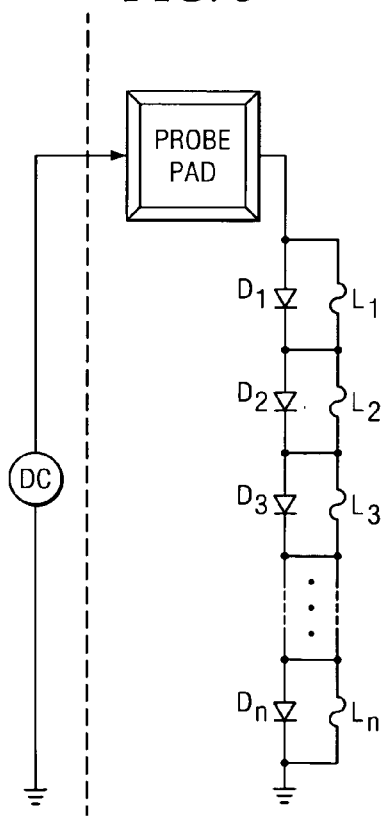
FIG. 3 is a diagram of a laser trim tracking circuit using diodes as the detection devices.

Diodes have their own distinctive forward bias load characteristic and can replace the resistors in the above circuit structure. A diode network is shown in FIG. 3. The diode network of FIG. 3 includes diodes D1, D2, D3, and Dn, and trim tracking links L1, L2, L3, and Ln. For monitoring the trim progress a current is applied to forward bias the diodes D1, D2, D3, and Dn and measure the voltage at the probe pad. Each blown link inserts a diode into the current path. The inserted diode ideally adds an extra voltage of, for example, 0.7 V in the voltage measurement. Hence, by monitoring this voltage drop, the number of links blown can be predicted and the trim status determined.

In both the above presented cases, to detect number of trim tracking links blown, an electrical measurement is made at the probe pad. The maximum number of trim tracking links that can be added on to one network is determined by the uncertainty of the measurement. The measurement uncertainty has two components: (1) measurement inaccuracy and (2) uncertainty due to process variation. Since the measurements are simple DC measurements, it is safe to assume that the contribution due to measurement inaccuracy to overall uncertainty is very small. Thus uncertainty will be dominated by the fabrication process variation. For analysis purpose, the measurement performed on a circuit structure when the process is at its nominal point is represented by m. Uncertainty in the measurement is represented by $\delta m$. When this uncertainty conceals the effect of a trim tracking link blast it will defeat the intent of the trim tracking circuit. For example, at the nth laser trim stage, condition for accurate trim tracking can be mathematically expressed in the following inequality.

$$(n-1) \times (m+\delta m) < n \times (m-\delta m) \quad \text{(Eq 1)}$$

From this inequality an equation for maximum number of trim tracking links that can be accommodated in one circuit structure is derived.

$$n_{\max} = \left\lfloor \frac{1}{2} \times \left( \frac{m}{\delta m} + 1 \right) \right\rfloor = \left\lfloor \frac{1}{2} \times \left( \frac{1}{\Delta} + 1 \right) \right\rfloor \quad \text{(Eq 2)}$$

Figure 4:
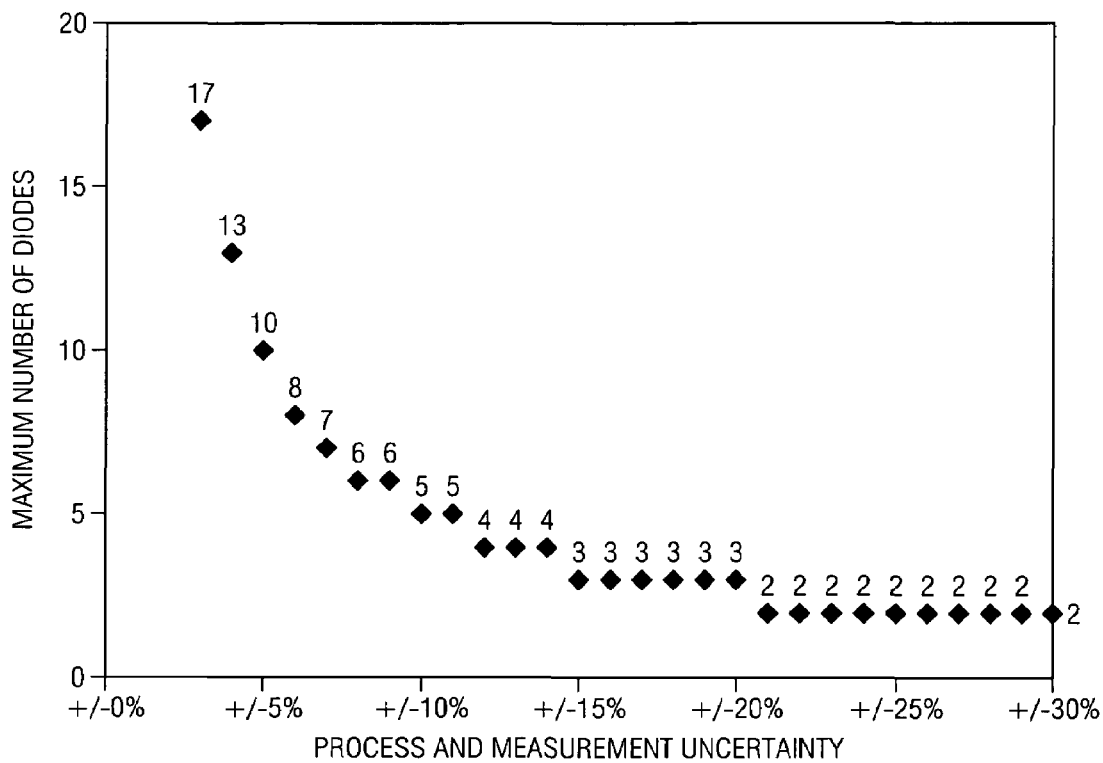
FIG. 4 is a plot of the maximum number of links that can be on a circuit for a given measurement variation.

In this equation $\Delta$ is the variation in measurement due to process shifts. FIG. 4 shows the plot of the maximum number of links that can be on a circuit for a given measurement variation.

To further describe this concept, two examples are described below.

EXAMPLE 1

Trim network consists of 1K resistor with 20% process variation. This process variation will translate to 20% measurement variation. Thus, there are only 3 links per network.

EXAMPLE 2

Trim network consists of diodes with 0.7V forward bias and 10% variation in diode drop. The 10% diode drop variation will translate to 10% measurement variation and thus there can be a maximum of 5 links per network. In general the non-ideal forward bias diode knee voltage may have a smaller process variation than the resistors and therefore, allow more diode link pairs and more incremental trim records.

From the description above and examples presented, it is clear that the key to increasing the number of trim tracking links per circuit structure is to reduce the measurement uncertainty. In semiconductor processing the absolute variation in the properties of an electrical component is typically very high. However, properties of components placed closely together are very well matched. If the electrical property of one of the components can be measured, that measurement can be used as m in the equations. Deviation of measurements on other components $\delta m$ will be very small since the component matching is very good.

Figure 5:
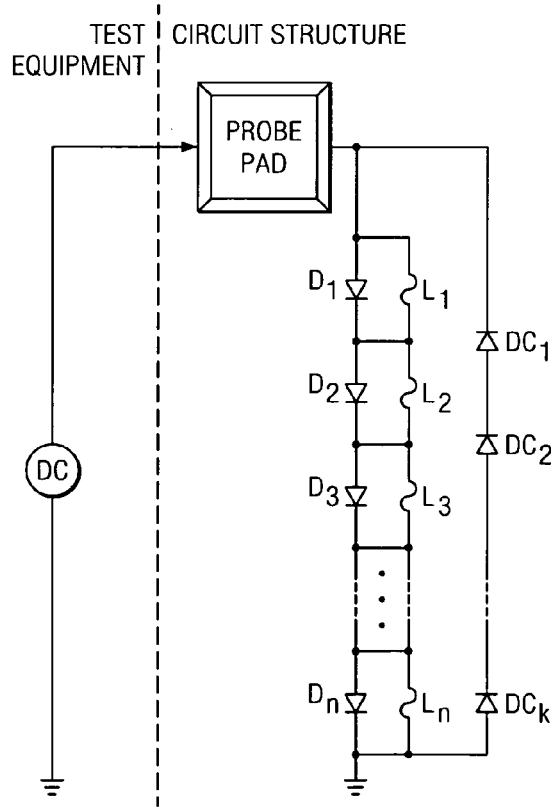
FIG. 5 is a diagram of a laser trim tracking circuit using a trim tracking diode string and a calibration diode string.

A preferred embodiment circuit structure that utilizes good matching in electronic circuits to do trim tracking efficiently is shown in FIG. 5. The circuit of FIG. 5 has two parts separated by a dotted line. Circuit structure that resides within the device is on the right side of the dotted line. The left side shows the measurement set up that utilizes the circuit structure for tracking trim. The measurement equipment shown is a DC source. This DC source has the capability to source or sink DC current and measure voltage across its terminal.

There are two series diode strings in the circuit structure. One diode string with diodes D1, D2, D3, and Dn has the trim tracking links L1, L2, L3, and Ln connected in parallel to them. This diode string D1-Dn is referred to as the trim tracking diode string. The number of diodes in this string is limited by the matching of the forward bias voltage of the diodes in a given technology. The maximum number of diodes that can be included in the circuit structure is given by $n_{max}$ in equation 2.

The second string of diodes marked as DC1, DC2, and DCk are used during the calibration step to measure the forward bias voltage of the diodes in a given device. This diode string DC1-DCk is referred to as the calibration diode string. Although a single diode is enough to measure the diode drop, a string of diodes is used for preventing junction break down of the diodes in the calibration diode string. The following analysis shows how the minimum number of diodes in the calibration string is determined.

When all the trim tracking links are blown and when the trim tracking diode string is forward biased, a maximum of $n_{max} \ast Vd_{max}$ voltage is seen across the calibration diode string, where $Vd_{max}$ is the maximum diode drop for the process technology. Under this condition, voltage drop across one of the diodes in the calibration diode string should not exceed the reverse break down voltage. Let the minimum reverse break down voltage of the diode in the process technology be $Bv_{min}$. To prevent reverse break down the following inequality needs to be satisfied.

$$Vd_{max} \times N_{max} < BV_{min} \times k \quad \text{(Eq3)}$$

In this inequality k represents the number of diodes in the calibration diode string. Thus, the minimum number of diodes $k_{min}$ is given by the equation below.

$$K_{\min} = N_{\max} \times \left( \frac{Vd_{\max}}{BV_{\min}} \right) \quad \text{(Eq 4)}$$

EXAMPLE

Diodes in a technology have maximum forward bias drop $Vd_{max}=0.8V$, matching of 1%, and minimum break down voltage of $Bv_{min}=4.0V$. From Equation 2, the maximum number of trim tracking links $n_{max}$ will be 50. The number of diodes in the calibration string will be $$K_{\min} = 50 \times \left( \frac{0.8}{4} \right) = 10.$$

Figure 6:
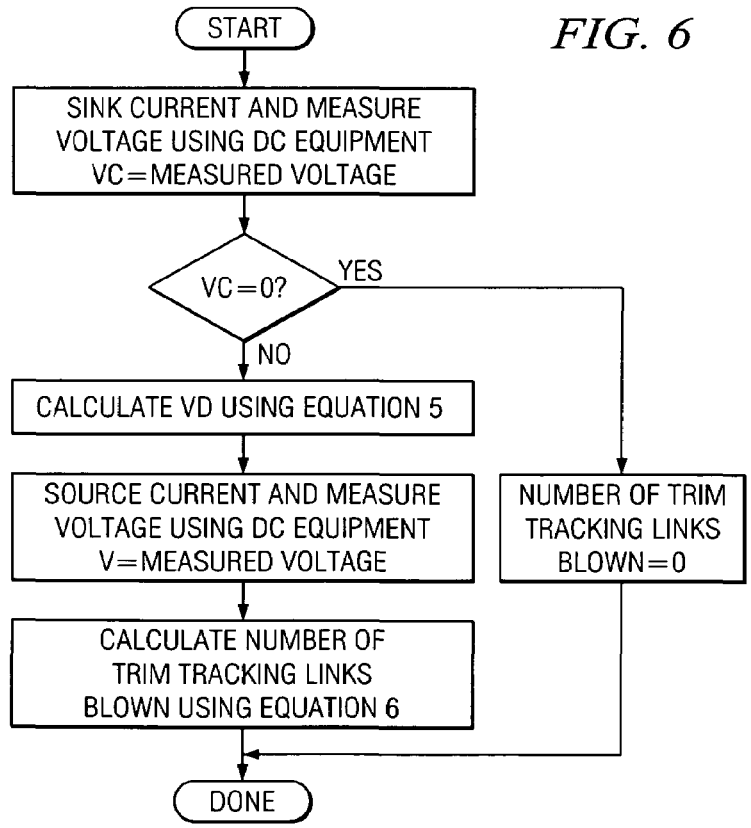
FIG. 6 is a flow chart of a step by step procedure for determining the laser trim status.

Test procedure that utilizes this circuit structure is shown in FIG. 6. The step by step procedure in determining the laser trim status is described below.

1. A DC current is sunk using the DC instrument. The calibration diode string gets forward biased. The voltage at the probe pad is measured using the voltmeter in the DC instrument and recorded as VC.

2. If VC is very close to zero that means there is a direct connection between probe pad and ground. Hence, the number of links blown will be equal to zero.

3. If VC is not close to zero, calculate the diode drop in the device using equation $$Vd = \frac{Vc}{K} \quad \text{(Eq 5)}$$

4. Source a current using the DC equipment. This will forward bias the trim tracking diode string. Voltage at the probe pad is measured using the DC equipment. Let this voltage be V.

5. The number of trim tracking links blown is calculated using the equation below.

$$N = \left\lfloor \frac{V}{Vd} \right\rfloor \quad \text{(Eq 6)}$$

6. From the number of links blown in steps 2 or 5 the status of the laser trim is determined.

Figure 1:
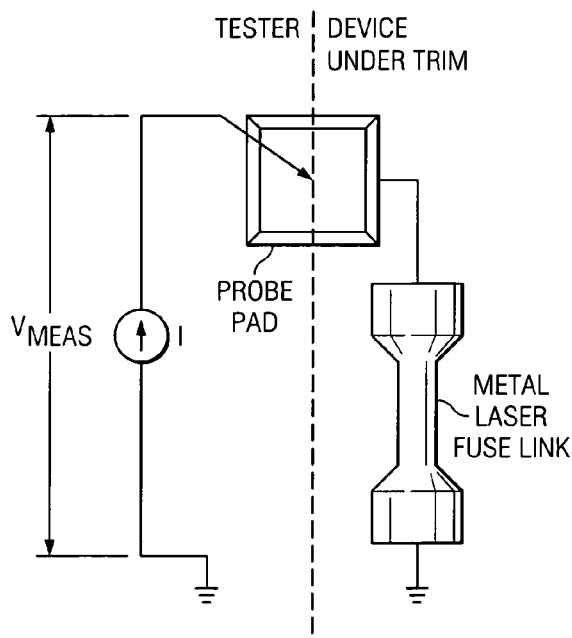
FIG. 1 is a diagram of a prior art laser trim tracking circuit.
Figure 7:
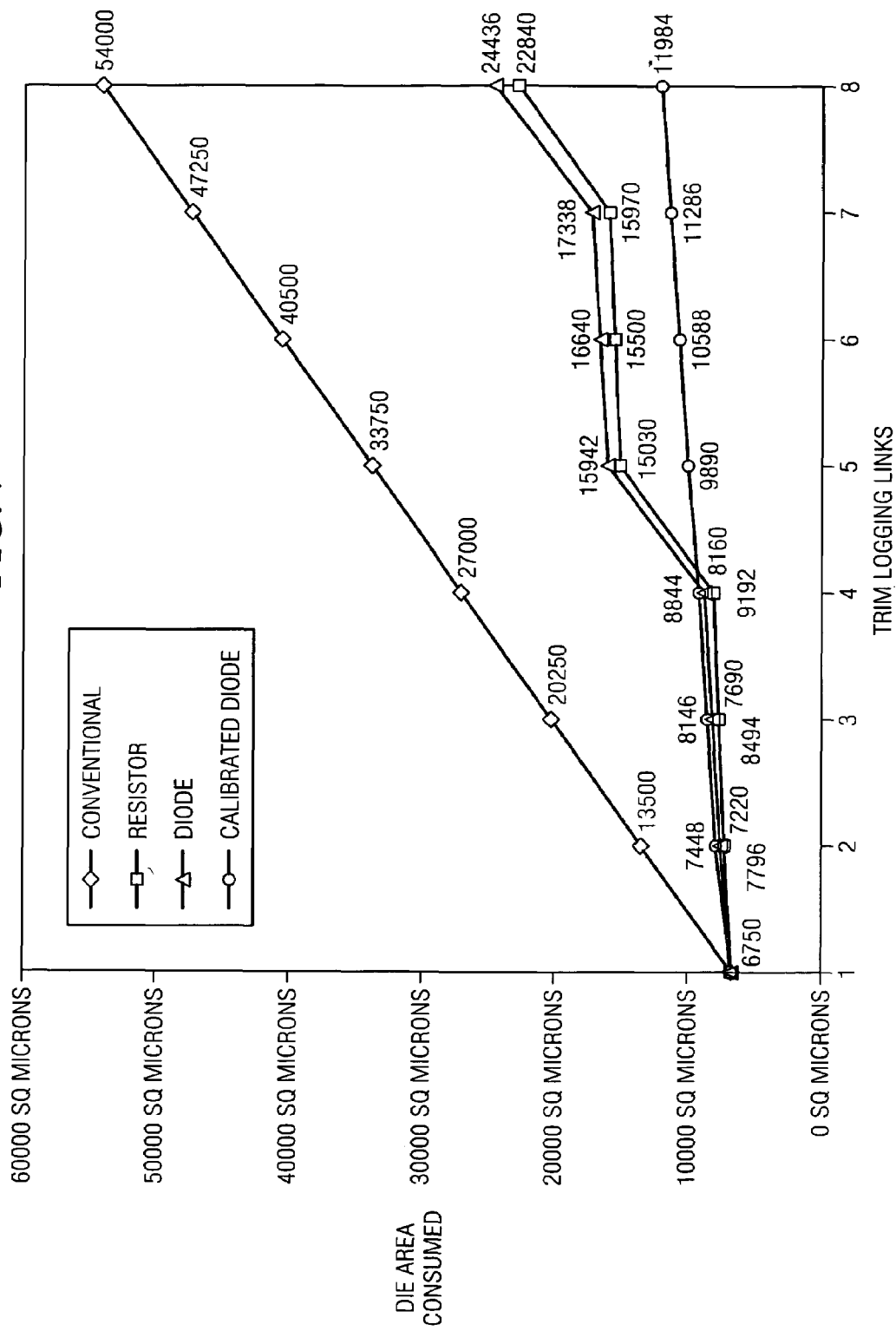
FIG. 7 is a graph of the die area consumed for four different trim logging networks using a typical circuit fabrication process.

FIG. 7 displays the die area consumed for each of the four trim logging networks described above using a typical circuit fabrication process as an example. The four trim logging networks are:

1. Conventional prior art method of inserting one probe pad for each link (FIG. 1).

2. Series resistor and link network (FIG. 2).

3. Series diode and link network (FIG. 3).

4. Preferred embodiment with series diode and calibration diode network (FIG. 5). This method consumes 78% less integrated circuit silicon area (a 204 micron by 204 micron square reduction), for 8 links, than the prior art method. As the number of links increase a better resolution in identifying the trim status is obtained. For the preferred embodiment, this advantage comes with minimum area overhead.

This circuit and method according to the present invention substantially reduces the device area required to record completed prior trim events. This removes previously trimmed features from the risks associated with laser trimming and retrimming. This same circuit and method allows detection of laser beam to work surface misalignment and the termination of lasing before critical active circuit components can be damaged.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A circuit comprising:
   a plurality of trim tracking links coupled in series;
   a plurality of detecting diodes wherein each detecting diode is coupled in parallel with a corresponding trim tracking link;
   a probe pad coupled to the string of trim tracking links; and
   a calibration diode device coupled in parallel with the plurality of trim tracking links.

2. The circuit of claim 1 wherein the calibration diode device comprises at least one diode.

3. The circuit of claim 1 wherein the calibration diode device comprises a plurality of diodes coupled in series, and coupled in parallel with the plurality of trim tracking links.

4. A circuit for detecting and tracking a status of a device under laser trim comprising:
   a series connected string of trim tracking links; and
   a plurality of detecting diodes wherein each detecting diode is coupled in parallel with a corresponding trim tracking link; and
   a plurality of calibration diodes coupled in series, and coupled in parallel with the series connected string of trim tracking links.

5. A circuit for detecting and tracking a status of a device under laser trim comprising:
   at least two trim tracking links coupled in series; and
   at least two trim tracking diodes wherein each trim tracking diode is coupled in parallel with a corresponding trim tracking link; and
   a calibration diode device coupled in parallel with the at least two trim tracking links.

6. The circuit of claim 5 wherein the calibration diode device comprises at least one diode.

7. The circuit of claim 5 wherein the calibration diode device comprises a plurality of calibration diodes coupled in series, and coupled in parallel with the at least two trim tracking links.

* * * * *